June 3, 1969    T. A. HARRIS ET AL    3,447,849
TAPERED ROLLER BEARING ASSEMBLY
Filed Dec. 18, 1967
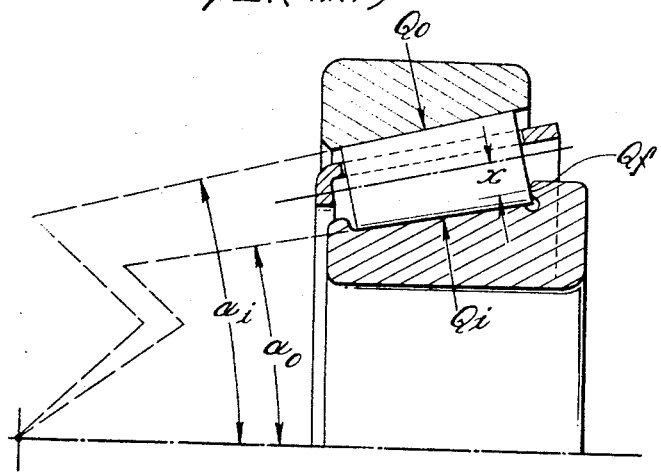
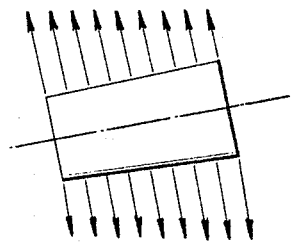
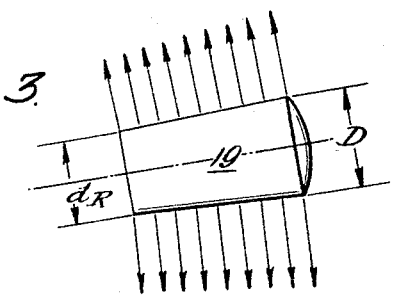
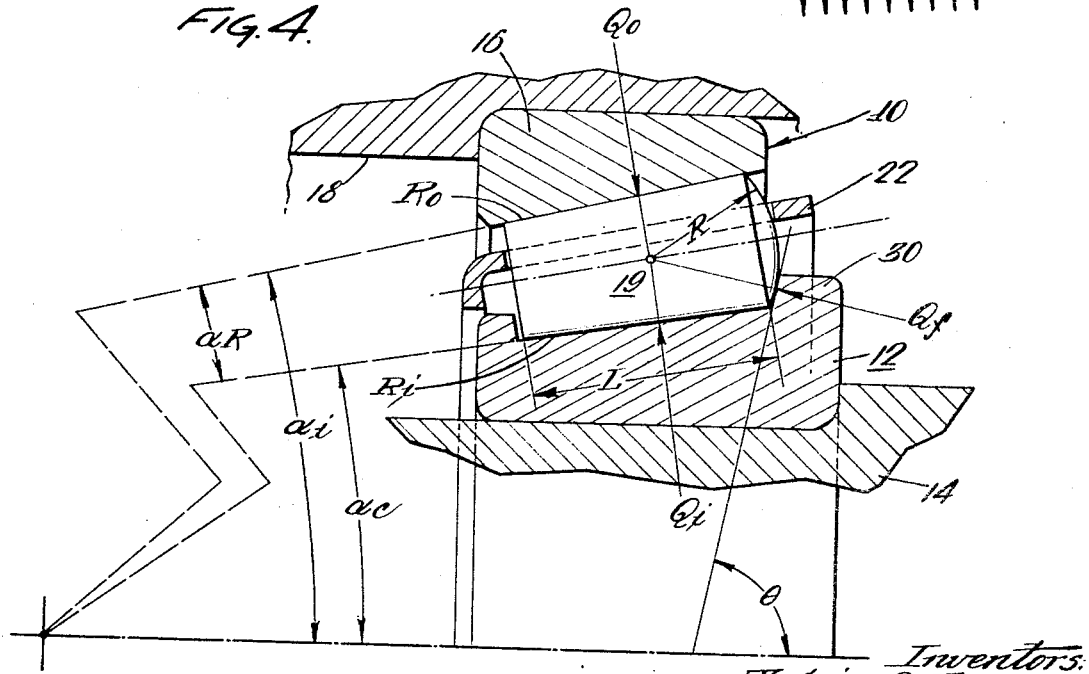
Inventors:
Tedric A. Harris
Frank W. Wellons
by Howson & Howson
Attys.

3,447,849
TAPERED ROLLER BEARING ASSEMBLY
Tedric A. Harris, Warminster, and Frank W. Wellons, Devon, Pa., assignors to SKF Industries, Inc., King of Prussia, Pa., a corporation of Delaware
Filed Dec. 18, 1967, Ser. No. 691,634
Int. Cl. F16c *19/36*
U.S. Cl. 308—214                 3 Claims

ABSTRACT OF THE DISCLOSURE

A tapered roller bearing assembly comprising inner and outer rings spaced apart to define therebetween an annular space, at least a portion of the confronting surfaces of the rings being angularly disposed relative to the rotational axis of the bearing to define frustoconical inner and outer raceways, a plurality of tapered rollers in the annular space, the large diameter end face of each roller being sphered. At least one flange at one end of one of the rings has a conical load bearing surface confronting the sphered ends of the rollers, the end sphere radius R of each of the rollers being approximately equal to $$\sqrt{\left(\frac{D}{2}\right)^2 + L\left[1 - \frac{1}{3}\left(\frac{3D - \alpha_R L}{2D - \alpha_R L}\right)\right]^2}$$

where $D$ is the large roller end diameter, $L$ is the roller length and $\alpha_R$ is the roller included angle. The conical load bearing surface is disposed at an angle $\theta$ relative to the raceway of one ring, the angle $\theta$ being approximately equal to $$+\alpha_c + \frac{\alpha_R}{2} + \arctan\left[\frac{D}{L\left[1 - \frac{1}{3}\left(\frac{3D\alpha_R L}{2D\alpha_R L}\right)\right]}\right] - 90$$

---

This invention relates to improvements in roller bearings and more particularly to improvements in tapered roller bearings.

Conventional tapered roller bearings of the type illustrated, for example in FIG. 1, generally comprise inner and outer rings having spaced apart confronting raceways defining an annular space for a plurality of rolling elements and a cage for circumferentially spacing and guiding the rolling elements. The inner and outer raceways are conventionally disposed at an angle relative to the axis of rotation of the inner ring and the inner ring is usually provided with a circumferentially extending guide flange confronting the large diameter axial end faces of the rollers. Typically, the large diameter axial end faces of the rollers are imperceptibly sphered or nearly flat and the guide flange surface confronting these end faces of the rollers is substantially perpendicular to the inner raceway and contacts the roller end faces at points in proximity to the inner raceway. Because of the difference between the inner and outer raceway contact angles, there are force components which drive the tapered rollers against the guide flange. Further, in these conventional tapered roller bearings because of the relatively large sliding friction generated at the guide flange and by roller skewing moments, the bearing is usually not used in high speed applications. Tapered roller bearings, as noted above, are designed to carry combinations or radial and thrust loads. Each roller in the bearing is subjected to inner ring loading designated $Q_i$, outer ring loading $Q_o$ and flange loading designated $Q_f$ and the magnitude of the flange load is given by the following equation:

$$Q_f = Q_o \frac{\sin(\alpha_o - \alpha_i)}{\sin(\alpha_i + \alpha_f)}$$

in which $\alpha_o$, $\alpha_i$, $\alpha_f$ are half the included angles of the outer ring or cup, the inner ring or cone and flange cone, respectively. In conventional tapered roller bearings it was believed that the roller-raceway loading along the roller length was uniform as shown by FIG. 3 to provide uniform stress along the entire length of the rollers whereby the load would be equally distributed along the length of the rollers. Thus, it was assumed that the effect of thrust loading on bearing fatigue life was nil, notwithstanding the fact that small roller skewing moments were caused by the thrust-carrying flange. It has been found, however, that this ideal loading resulting in uniform stress does not actually occur owing to a roller tilting moment $XQ_f$. The actual loading on the rollers of conventional tapered roller bearings is illustrated in FIG. 2. Further it has been found that this type of loading causes roller skewing moments and tends to reduce fatigue life of the bearing. Additionally, it has been found that as a result of the skewing moments on the rollers, there is produced a friction torque causing generation of heat which contributes to certain types of bearing failure.

Moreover by reason of the configuration of the flange and end faces of the rollers, it has been found that when these roller bearing assemblies are used in applications to take comparatively heavy axial load, the bearing assemblies are prone to distress such as smearing, welding, pulling or scuffing on the thrust flange and the roller surfaces. Further, since the engagement of the flange and roller end faces is remote from the roller raceway adjacent the terminal edge of the flange, there is a tendency for the roller to slide which also reduces fatigue life.

In accordance with the present invention to eliminate roller tilting and subsequent skewing, the roller bearing is characterized by novel features of construction and arrangement including a large end guide flange having a conical bearing surface and rollers having the large diameter end sphered with a center radius disposed at the intersection of the effective inner and outer ring loads. Thus, the roller end-flange load will be directed through this intersection eliminating roller tilting moments, roller tilting and subsequent skewing. More specifically it has been found that the assembly has optimum load capacity as well as other functional advantages noted hereafter when the parts of the bearing assembly are characterized by particular bearing configuration where the annular bearing surface is tapered outwardly at an angle substantially $$\theta = +\alpha_c + \frac{\alpha_R}{2} + \arctan\left[\frac{D}{L\left[1 - \frac{1}{3}\left(\frac{3D - \alpha_R L}{2D - \alpha_R L}\right)\right]}\right] - 90$$

and the sphered end radius of the rollers is given by the equation $$R\sqrt{\left(\frac{D}{2}\right)^2 + L^2\left[1 - \frac{1}{3}\left(\frac{3D - \alpha_R L}{2D - \alpha_R L}\right)\right]^2}$$

wherein D is the large roller end diameter, L is the roller length, $\alpha_R$ is the roller included angle, and $\alpha_c$ is the cone contact angle or one-half included angle of the cone.

By this specific arrangement it has been found that there is a substantial improvement in the fatigue life of a bearing assembly, roller skewing tendencies are minimized resulting in considerably less friction torque and heat generation. More specifically, the relationship of the guide flange cone half angle $\theta$ and the radius of the sphered end face of the roller is such that the inner and outer ring loading on the rollers is substantially uniform providing uniform stress whereby the tendency of the rollers to tilt or skew is minimized. Moreover, by reason of the specific relationship of elements as described, the roller end-flange load is directed through the intersection of the inner and outer ring points of loading $Q_i$ and $Q_o$ thus eliminating the moment arm X and consequently eliminating roller tilting. Further, the roller contact with the surface of the flange is near the base of the flange thereby substantially minimizing sliding velocity and providing lower friction in the overall operation. This reduces heat generation and accordingly less lubricant is needed. Further it is noted that there is a reduction in the tendency of the roller end surfaces and the flange surface to weld, smear, pull or scuff.

These and other objectives of the present invention and the various specific details of a bearing constructed in accordance with the present invention are hereinafter more fully set forth with reference to the accompanying drawing, in which:

FIG. 1 is a fragmentary sectional view of a conventional prior art type tapered roller bearing assembly;

FIG. 2 is a view showing the loading pattern of a conventional tapered roller bearing of the type shown in FIG. 1;

FIG. 3 is a view showing the loading pattern on a roller in a tapered roller bearing assembly in accordance with the present invention; and FIG. 4 is a fragmentary sectional view of a tapered roller bearing in accordance with the present invention.

Referring now to the drawing and particularly to FIG. 4 thereof, there is illustrated a roller bearing assembly 10 in accordance with the present invention. The roller bearing assembly comprises an inner ring 12 or cone adapted to be mounted on a shaft 14, an outer ring 16 or cup supported in a housing or the like 18, a plurality of rollers 19 in the annular space between the rings, and a cage 22 for guiding and circumferentially spacing the rollers during operation of the bearing.

In the present instance the rolling bearing assembly is a tapered roller bearing assembly wherein the inner and outer rings have generally frustoconical confronting raceways $R_i$ and $R_o$ and the rollers are tapered, the taper of the rollers and the inner ring and outer ring path having a common apex on the bearing axis. In the present instance the inner ring is formed to provide a guide flange 30 which confronts the large diameter roller axial end faces.

In a tapered roller bearing assembly of the type shown in FIG. 1, the rollers have imperceptibly sphered or nearly plane large diameter end faces and the surface of the guide flange confronting the axial end faces of the rollers is substantially perpendicular to the inner raceway. The reacting load between the roller end and guide flange is directed through the common apex on the bearing axis. Thus, there is a roller tilting moment $XQ_f$ and the roller-raceway loading along the length of the roller is not uniform. This nonuniform roller-raceway loading is illustrated in FIG. 2. This loading causes roller skewing moments and tends to reduce endurance of the bearing.

Further by this arrangement as noted above, it was erroneously assumed that the effect of the thrust loading on the bearing fatigue life was nil, notwithstanding the fact that small roller skewing moments were caused by the thrust-carrying flanges. In other words, it was believed that the roller-raceway loading along the roller length was uniform as illustrated in FIG. 3. Actually this ideal loading which produces uniform stress does not occur owing to the roller tilting moment $XQ_f$; the actual loading is a nonuniform loading which causes roller skewing moments and tends to reduce endurance of the bearing. (See FIG. 2.) More specifically this applied thrust load tends to tilt the rollers about their geometric centers. This tilting is caused by thrust couple at each roller location and consequent to the thrust couple and roller tilting, nonuniform loading occurs along the roller length and raceway.

In accordance with the present invention, the bearing assembly is characterized by novel features of construction and arrangement providing improved fatigue life, reduction of roller skewing tendencies, less friction torque and heat generation. More specifically, it has been found that for a particular tapered roller bearing configuration, roller tilting and subsequent skewing may be eliminated by fabricating the roller large end as a portion of its sphere whose center lies at the intersection of the effective inner and outer loads $Q_i$, $Q_o$ and by making the guide flange bearing surface outwardly conical at a predetermined half angle $$\theta = +\alpha_c + \frac{\alpha_R}{2} + \arctan\left\{\frac{D}{L\left[1 - \frac{1}{2}\left(\frac{3D - \alpha_R L}{2D - \alpha_R L}\right)\right]}\right\} - 90$$

whereby the roller end-flange load $Q_f$ is directed through the intersection of the applied inner and outer raceway loading $Q_i$ and $Q_o$, thus eliminating the moment arm X and roller tilting. The roller end sphere radius required to achieve this condition is given by the following equation:

$$\sqrt{\left(\frac{D}{2}\right)^2 + L^2\left[1 - \frac{1}{3}\left(\frac{3D - \alpha_R L}{2D - \alpha_R L}\right)\right]^2}$$

where D is the roller large end diameter, L is the roller length and $\alpha_R$ is the roller included angle. Thus end flange load $Q_f$ intersects the roller axis at the point Z which is displaced from the roller axial midpoint $L/Z$ toward the large end of the roller.

By this construction, there is improved fatigue life, reduced roller skewing tendencies and less friction for heat generation resulting from less roller skewing. Moreover, as noted previously, the bearing operates at lower friction thus reducing the demand on lubricant, and the tendency of the roller end faces and flange load surface to weld, smear, pull or scuff is minimized. Further, the area of contact between the sphered large roller end faces is such that even under maximum conditions of roller skewing the terminal edge of the flange does not cut into the sphered roller end face. By eliminating roller skewing, uniform roller loading is achieved as illustrated in FIG. 3. With respect to FIG. 4 it is noted that the roller end sphere radius emanates from the roller geometrical center, and thus the flange roller loading is directed through this center eliminating moment arm X and the roller skewing moments.

We claim:

1. A tapered roller bearing assembly comprising inner and outer rings spaced apart to define therebetween an annular space, at least a portion of the confronting surfaces of said rings being angularly disposed relative to the rotational axis of the bearing to define frustoconical inner and outer raceways, a plurality of tapered rollers in the annular space, the large diameter end face of each roller being sphered, at least one flange at one end of one of said rings having a conical load-bearing surface confronting the sphered ends of the rollers, the end sphere radius R of each of the rollers being approximately equal to $$\sqrt{\left(\frac{D}{2}\right)^2 + L\left[1 - \frac{1}{3}\left(\frac{3D - \alpha_R L}{2D - \alpha_R L}\right)\right]^2}$$

where $D$ is the large roller end diameter, $L$ is the roller length and $\alpha_R$ is the roller included angle.

2. A tapered roller bearing assembly as claimed in claim 1 wherein the conical load bearing surface is disposed at an angle $\theta$ relative to the bearing axis the angle $\theta$ being aproximately equal to $$+\alpha_c \frac{\alpha_R}{2} + \arctan\left\{\frac{D}{L\left[1 - \frac{1}{3}\left(\frac{3D - \alpha_R L}{2D - \alpha_R L}\right)\right]}\right\} - 90$$

3. A tapered roller bearing assembly as claimed in claim 1 wherein said flange projects from said inner ring.

References Cited
FOREIGN PATENTS
541,618  12/1941  Great Britain.

MARTIN P. SCHWADRON, *Primary Examiner.*

FRANK SUSKO, *Assistant Examiner.*

UNITED STATES PATENT OFFICE
CERTIFICATE OF CORRECTION

Patent No. 3,447,849                                       June 3, 1969

Tedric A. Harris et al.

It is certified that error appears in the above identified patent and that said Letters Patent are hereby corrected as shown below:

Column 4, lines 43 to 45, -- R= -- should be inserted before the formula. Column 6, lines 1 to 4, that portion of the formula reading $$\frac{+a_c a_R^+}{2} \quad \text{should read} \quad \frac{+a_c + a_R^+}{2}$$

Signed and sealed this 26th day of May 1970.

(SEAL)
Attest:

Edward M. Fletcher, Jr.                        WILLIAM E. SCHUYLER, JR.
Attesting Officer                                 Commissioner of Patents